United States Patent

[11] 3,599,741

| [72] | Inventor | LeRoy Langford |
| --- | --- | --- |
| | | La Porte, Ind. |
| [21] | Appl. No. | 848,859 |
| [22] | Filed | Aug. 11, 1969 |
| [45] | Patented | Aug. 17, 1971 |
| [73] | Assignee | Allis-Chalmers Manufacturing Company |
| | | Milwaukee, Wis. |

[54] DRIVE AND STEERING MECHANISM FOR WHEELED VEHICLES
5 Claims, 6 Drawing Figs.

[52] U.S. Cl. .................................................. 180/6.48, 74/480
[51] Int. Cl. ............................................... B62d 11/04
[50] Field of Search .......................................... 180/6.48, 77 H; 74/480, 479, 491, 469

[56] References Cited
UNITED STATES PATENTS

| 3,181,389 | 5/1965 | Richard ...................... | 74/480 |
| 3,323,607 | 6/1967 | Futamata .................... | 180/6.48 |

Primary Examiner—Benjamin Hersh
Assistant Examiner—John A. Pekar
Attorneys—Kenneth C. McKivett, Charles L. Schwab and Robert B. Benson ABSTRACT: A swather having two drive wheels which are hydraulically operated by individual variable displacement pumps and motors and wherein such pumps are controlled by a movable steering column rotatably mounting a manual steering control member which is operatively connected to the transmission control linkage by means of auxiliary linkage including a pair of laterally spaced control members which are capable of lateral displacement while applying differential displacement to the transmission control linkage.

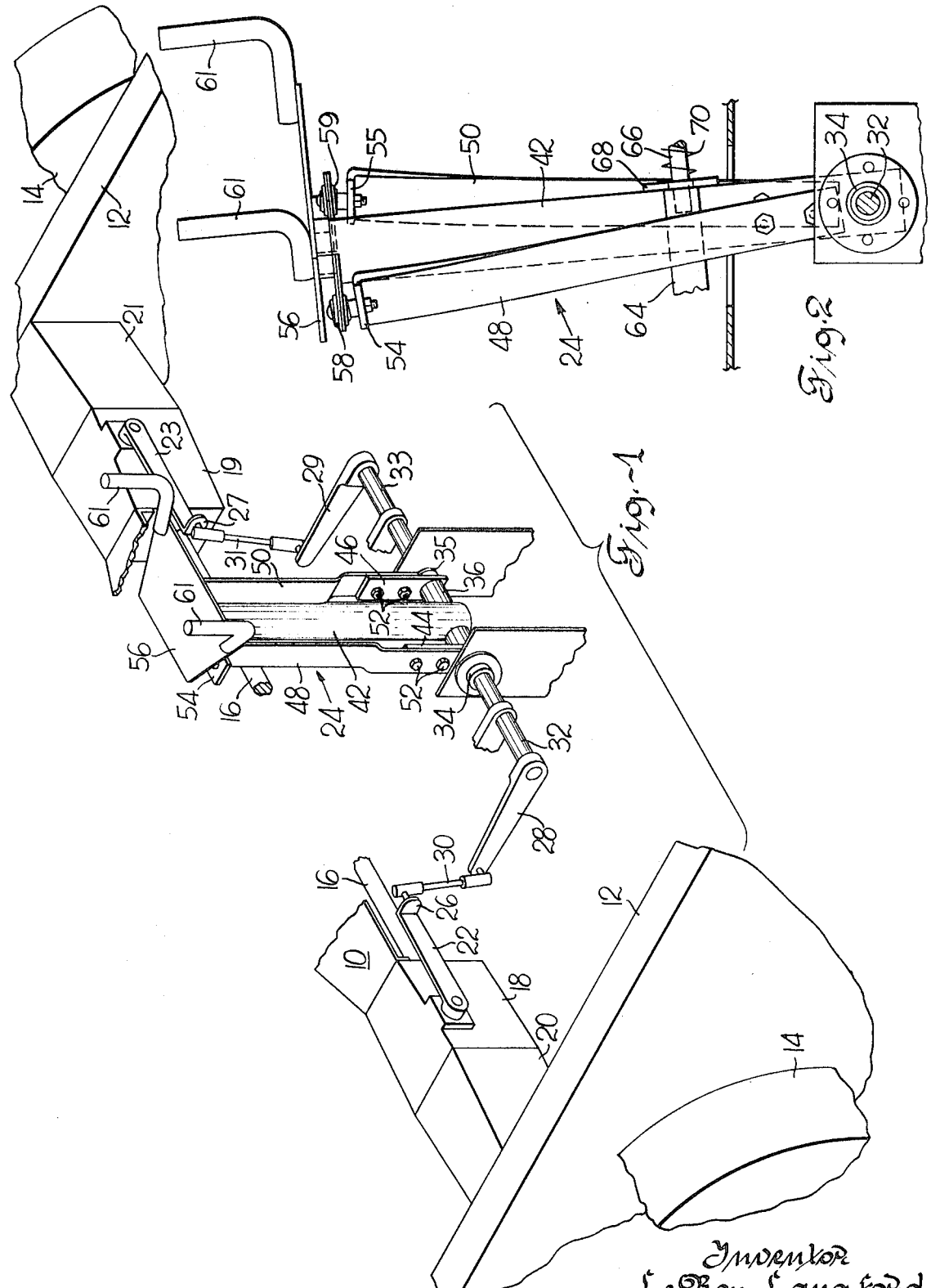

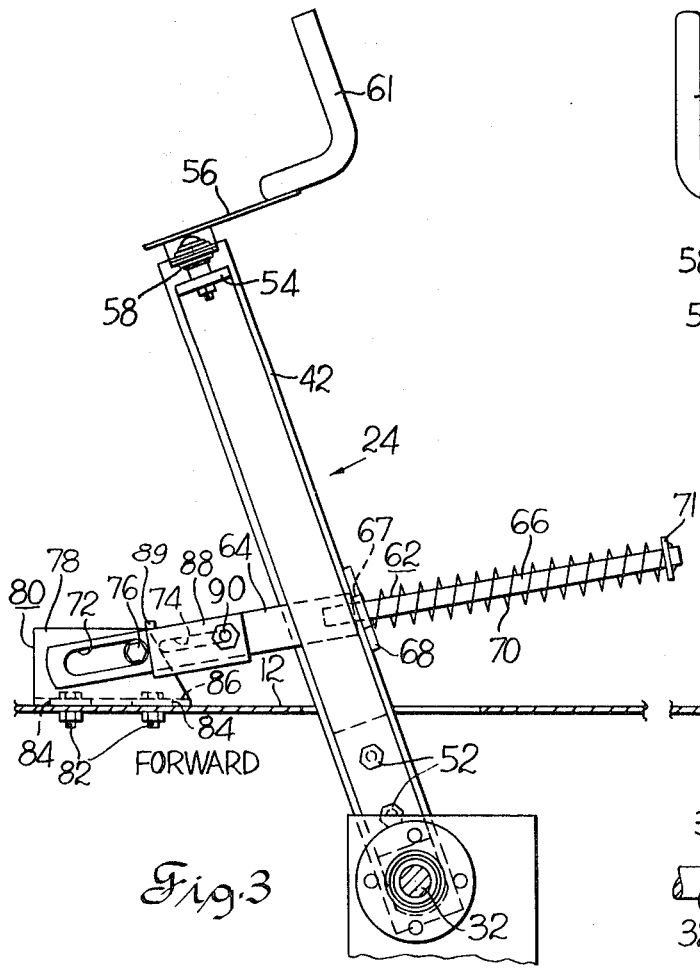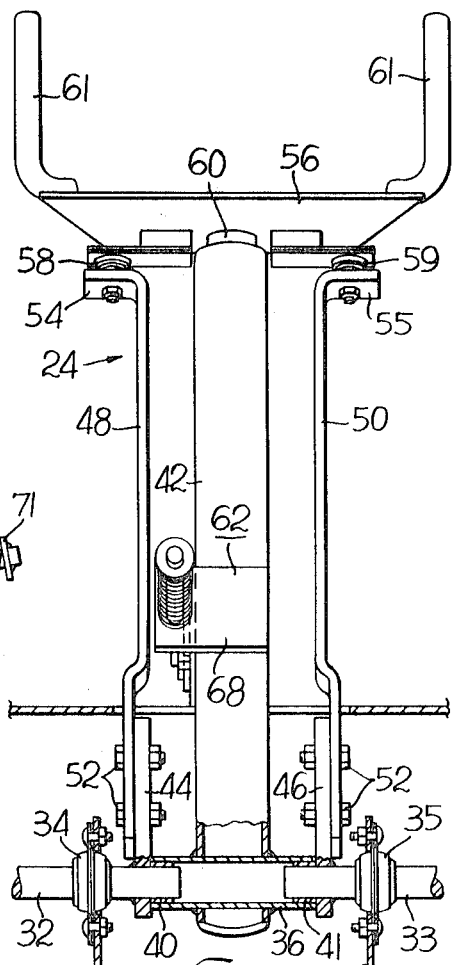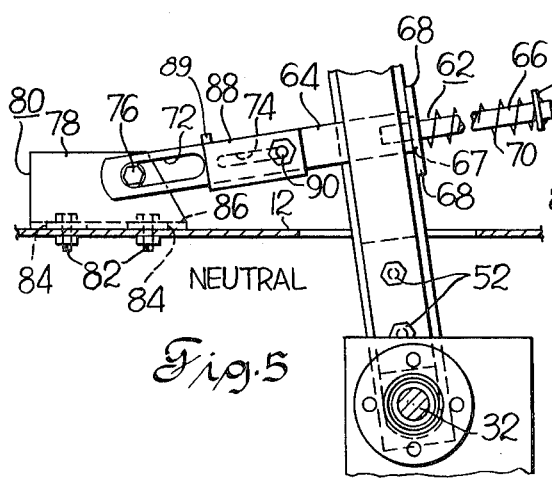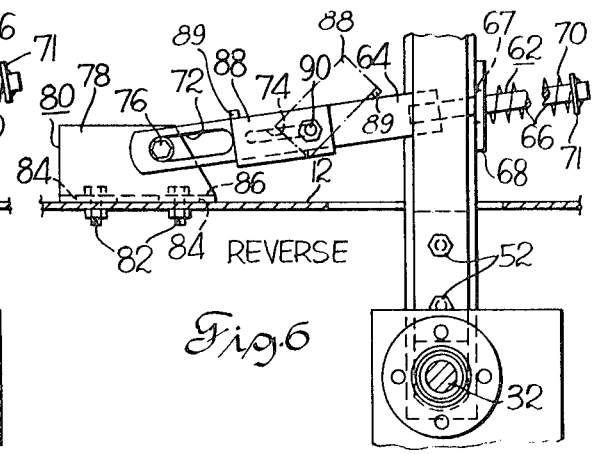

DRIVE AND STEERING MECHANISM FOR WHEELED VEHICLES

The present invention relates to vehicle control systems and more particularly to a new and improved steering system for a vehicle having driven propelling means movable at different speeds and direction for purposes of steering.

It is generally old in the art to provide an agricultural vehicle or implement, such as a self-propelled swather, with power-driven wheels at opposite sides supported for independent rotation and to have individually variable transmissions for each wheel which are adjustable to vary both the speed and direction of the drive. It is also old to mount a control column on the vehicle for pivotal movement about a transverse axis and to provide linkage connecting the column with the transmission, the linkage being operable to selectively and simultaneously adjust both transmissions into a neutral position, a forward drive position and a rearward drive position with the speed determined by the amount of movement of the column in either direction from its neutral position. The vehicle control column has in the past rotatably mounted a hand or steering wheel which is provided with auxiliary linkage operatively connecting the steering wheel with the transmission control linkage which is operative to differentially change the column effected adjustments of the linkage to produce opposite speed changes in the traction wheels and consequently turning of the vehicle.

The steering means and associated control linkage has previously consisted of mechanism involving numerous pivots, gears, bellcranks and links. These prior devices were complex, difficult to maintain and service as well as being expensive to manufacture.

It is an object of the present invention to provide a movable steering column rotatably mounting a manual steering control member which is operatively connected to the transmission control linkage be means of auxiliary linkage consisting of a pair of laterally spaced vertical control members which are capable of lateral displacement while applying differential displacement to the transmission control linkage.

A further object of the invention is to provide adjustable rigid abutments to limit the fore and aft movement of the control column thereby controlling the maximum speed for forward and rearward travel, and a resilient abutment for locating the control neutral position with the control column compressing the resilient abutment to place the transmissions in reverse.

It is a further object of this invention to provide a steering control mechanism that is simple and practical in construction, strong and reliable in use, efficient and durable in operation, compact in structure, inexpensive to manufacture and otherwise well adapted for the purposes for which it is intended.

These together with other objects and advantages which will become subsequently apparent reside in the details of construction and operation as more fully hereinafter described and claimed, reference being had to the accompanying drawings forming a part hereof, wherein like numerals refer to like parts throughout and in which:

FIG. 1 in an isometric view of the steering and speed regulating mechanism of this invention with some parts broken away from the front portion of the vehicle;

FIG. 2 is a side elevation view of the steering mechanism, with the steering mechanism turned to activate the vehicle to the right;

FIG. 3 is a side elevation view of the steering mechanism in a forward position;

FIG. 4 is a rear view partially in section of the mechanism shown in FIG. 3; and FIGS. 5 and 6 are side elevation views similar to FIG. 3 but showing the neutral and reverse positions, respectively, of the mechanism.

Referring now to FIG. 1, the swather 10 has a relatively wide frame structure 12 which is supported by traction members or wheels 14 and at the rear by a castoring wheel (not shown) mounted on a rearwardly projecting portion of frame 12. The swather 10 also carries at its forward end suitable crop-handling means (not shown) for performing a cutting, conditioning and positioning function on a crop. An engine (not shown) drives a transverse shaft 16 by any suitable means with such shaft simultaneously driving two variable displacement hydraulic pumps or power sources 18 and 19 which are operatively united with hydraulic motors 20 and 21, respectively, that drive the front traction wheels 14 of the swather. The variable displacement pumps 18 and 19 are provided with a controller 24 which includes pivotal control levers 22 and 23, respectively, which individually regulate the volume and direction of the hydraulic fluid being pumped to the motors 20 and 21. The linkages between pumps 18, 19 and controller 24 will now be described in detail.

The distal ends 26 and 27 of the pump control levers 22 and 23, respectively, are pivotally connected to lever arms 28 and 29, respectively, by means of depending links 30 and 31, respectively, each of which are equipped with universal ball joints or the like. Lever arms 28 and 29 are fixed to transverse shafts 32 and 33, respectively, such shafts being rotatably supported on the swather frame 12 by means of suitable bearings 34 and 35, respectively, as best shown in FIG. 4. A central tubular member 36 is rotatably supported by the inner ends of the transverse coaxial shafts 32 and 33 which are equipped with sleeve bearings 40 and 41, respectively, for this purpose. An upright tubular column 42 is centrally positioned with respect to transverse member 36 and rigidly secured thereto as by welding. The inner portions of the shafts 32 and 33 are provided with arms 44 and 46, respectively, which are rigidly secured thereto for rotation therewith. A pair of vertical steering control members 48 and 50 are rigidly connected to the arms 44 and 46 by means of capscrews 52 received by suitable nuts. The upper ends of the steering members 48 and 50 are bent outwardly with the horizontal end portions 54 and 55, respectively, connecting to the outer ends of a transverse steering device or platform 56 by means of ball joints assemblies 58 and 59, respectively. Transverse steering device 56 is provided with a depending portion 60 which is rotatably received in the upper portion of column 42. Device 56 is provided with a pair of handgrips 61 to manually actuate control assembly 24.

Fore and aft movement of control columns assembly 24 is operative through the aforedescribed linkages to adjust hydraulic pumps 18 and 19 for engaging and disengaging the drive and varying the speed and direction in which the swather is to be driven.

A rotative adjustment of the steering platform 56 about the longitudinal axis of tubular member 42 varies the relationship of the linkages to the steering column and the hydraulic pumps 18 and 19 to adjust the hydraulic pumps differentially so as to impart different rotative speeds to the swather drive wheels 14 and thereby steer the swather.

A limiting device 62 which has been eliminated from FIG. 1 for the sake of clarity is best shown in FIGS. 3, 5 and 6. This limiting device is designed for positioning the controller 24 in its neutral position and limiting the speed of the swather either in a forward or reverse direction. Limiting device 62 includes a forward strap 64 having a rearwardly extending rod 66 welded thereto, such rod being slidably received in an opening 67 in a plate 68 rigidly welded to the column tube 42. A resilient abutment in the form of a compression spring 70 surrounds the rod 66 and is retained thereon by being positioned between plate 68 and washer 71, adjustable attached to the outer end of rod 66. Washer 71 may be positioned in any desired position on rod 66 so that spring 70 biases column 42 to its neutral position. Spring 70 also limits the extent that column 24 may be moved rearwardly thereby limiting the maximum rearward speed of the vehicle. Forwardly extending strap 64 is provided with a pair of spaced elongated slots 72 and 74 with the end slot 72 receiving a bolt and bushing 76 which are connected to the vertical leg 78 of an angle bracket 80 attached to frame 12. The bracket 80 is secured to frame 12 by means of bolts 82 which are received by slots 84 in the horizontal leg 86 of the bracket 80. An abutment member 88 having a stop portion 89 is adjustably and pivotally connected to the rearward slot 74 in the strap 64 with the member 88 retained parallel to the strap 64 by a stop lug 90.

The stop 89 of abutment member 88 contacts the bolt 76 to limit the forward movement of the strap 64 relative to the swather and thereby limits the forward movement of the control column 42 and the forward speed of the swather to something less than the maximum.

Neutral position of the control assembly 24 is determined by the plate 68 contacting the compression spring 70 and bolt 76 contacting the forward end of slot 72. Forward movement of the control column from this point will drive the swather in a forward direction with the speed being determined by the rear of slot 72 or any portion thereof as determined by the adjusted position of the secondary abutment member 88 and its stop 89. This adjustment is provided so that the maximum field speed of the swather can be preset enabling the operator to return easily to this speed at anytime. When in transport or storage abutment member 88 can be pivoted to the adjusted position shown in broken lines in FIG. 6. Rearward movement of the control column 42 from its neutral position will compress spring 70 and cause the swather to move rearwardly. The movement of control assembly to the rear and accordingly the rearward speed of the swather being limited by the position of washer member 71.

It is apparent that column 42 with steering platform 56 and associated members 48 and 50 provide very simple and efficient means for controlling the movements of the swather. Engagement of the drive for either forward or reverse travel and for stopping is effected selectively by pivoting the column fore and aft about the pivot axis of shafts 32 and 33. Forward movement of the column results in forward movement of the swather with the opposite movement of the column producing reverse movement of the swather. Steering is accomplished by simply rotating the steering platform in the direction in which it is desired to turn the swather. Rotation of the steering platform 56 about the vertical axis of column tube 42, in a clockwise direction as viewed in FIG. 1 results in the upper end portion 54 of vertical control member 48 moving forwardly in an arc about the pivot axis of steering platform 56 and the upper end of the control member 50 moving rearwardly a corresponding amount. The control members 48 and 50 will be pivoted forwardly and rearwardly, respectively, about the axis of the shafts 32 and 33 causing said shafts to pivot in opposite directions. The lateral displacement of the upper end ball joints of the control members 48 and 50 caused by their arcuate movement bends or flexes the control members inwardly with the ball joints preventing any twist from developing. This structure is simple, eliminating the need for any gears and reducing the number of pivots and the like to a minimum.

If it is desired to turn more sharply than can be accomplished by merely turning the steering bar 56 as you are proceeding in a forwardly direction, it is only necessary to ease column 24 back toward the operator. Whether turning right or left, this puts one of the pumps and its motor into neutral thus stopping the wheel actuated thereby and causing the swather to pivot about such wheel as a center. If the column is moved still further toward the operator, the decelerated pump and its motor are shifted into reverse while the other pump and motor continue in forward drive, thus causing the swather to pivot about an axis intermediate the drive wheels.

It is apparent that this invention can be embodied in a crawler-type tractor wherein motors 20 and 21 would be drivingly connected to track-laying traction devices positioned at the sides of the tractor.

The embodiments of the invention in which I claim an exclusive property or privilege are defined as follows:

1. A variable-speed control and steering device for vehicles having a pair of reversible and independently operable traction members positioned on opposite sides of said vehicle, said device comprising in combination, a pair of drive means, each drivingly connected to a respective traction member; a pair of power sources; a controller for directing power from said sources to its respective drive means to vary the speed and direction of the associated drive means; said controller including a pair of transversely aligned shafts pivotally supported by said vehicle and connected at their outboard ends with mechanism for directing said power supply, said shafts being joined adjacent their inward ends to a pair of transversely spaced radially extending control members, a sleeve member pivotally receiving the inboard ends of said shafts, a control column attached to said sleeve at a midportion thereof and extending adjacent to and equally spaced from said control members, said control column and said control members being joined at the outer ends thereof by a steering platform, said steering platform being pivotal about the longitudinal axis of said control column for moving said control members in opposite directions and thereby moving said shafts in opposite directions to provide a speed differential between said traction members for steering said vehicle; said control column, said control members, said steering platform and said shafts being interconnected forming a unit for pivotal movement about the common axis of said shafts for uniformly increasing the forward speed of said traction members when said unit is pivoted forwardly and for uniformly decreasing the forward speed of said traction members when such unit is pivoted rearwardly until a neutral position is obtained and further rearward pivotal movement of said unit results in uniform reverse movement of said traction members.

2. In the combination recited in claim 1 and wherein a plate is attached to a midportion of said control column and being provided with an opening for slidably receiving a longitudinally extending rod, said rod having a strap portion provided with a slotted portion at its forward end for receiving a member carried by said vehicle, means for adjusting the effective length of said slotted portion so that movement of said column in a forward pivotal movement is limited by said member abutting the rear end of said slotted portion and thereby limiting the forward speed of said vehicle.

3. In the combination recited in claim 2 and wherein movement of said column in a rearward direction results in said column reaching a neutral position when said member abuts the rear end of said slot.

4. In the combination recited in claim 3 and wherein spring means are mounted about said rod for biasing said column to said neutral position, said rod being provided with adjustable means coacting with said spring for limiting the movement of said column from said neutral position to maximum reverse position.

5. In the combination recited in claim 1 and wherein said control members being attached to said steering platform by means of universal joints so that as said steering platform is pivoted about said control column said control members move in opposite directions.